3,085,963
NEW METHOD OF CONNECTING SOLID MODERATOR RODS IN AN ATOMIC PILE

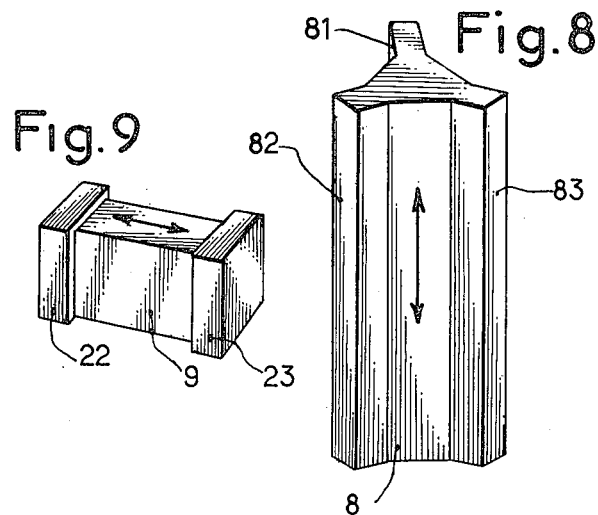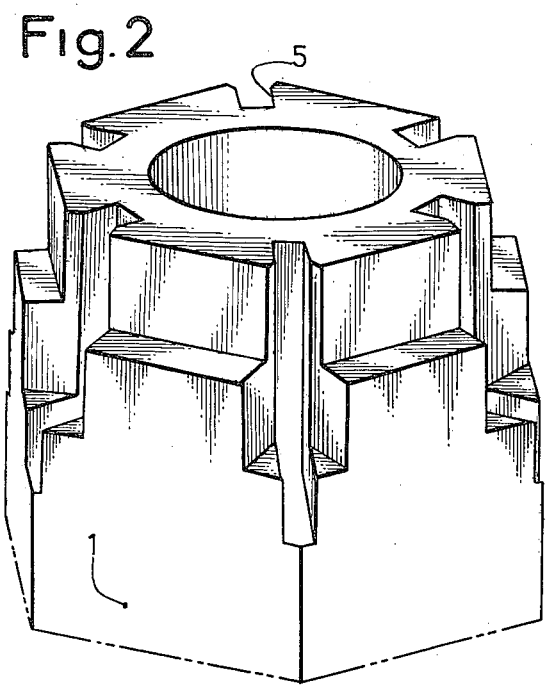

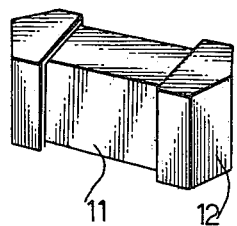
Fig.4 bis
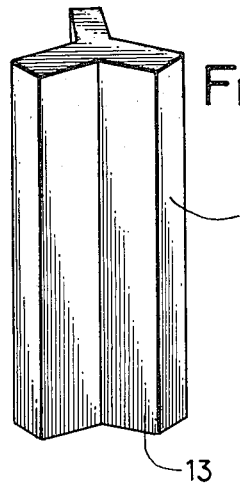
Fig.4
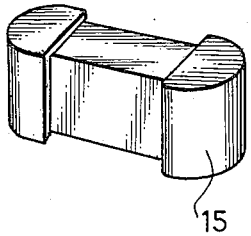
Fig. 5 bis
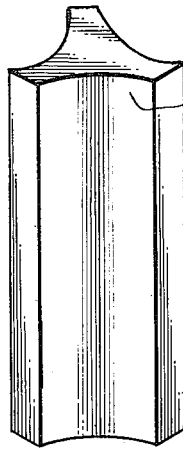
Fig.5

Roger Martin, Paris, France, assignor to Commissariat a l'Energie Atomique, Paris, France
Filed Oct. 14, 1959, Ser. No. 846,470
Claims priority, application France Oct. 18, 1958
9 Claims. (Cl. 204—193.2)

Atomic piles comprising a solid moderator, such as graphite, for example, generally have an active portion consisting of a stack of moderator rods or bars pierced with ducts in which the fissionable material is disposed, and in which the cooling fluid circulates.

A plurality of types of stacks are at present known, and particularly vertical stacks, that is to say stacks consisting of vertically disposed rods having ducts bored along their axes.

The present invention relates to a new method of connecting solid moderator rods in an atomic pile; it enables improved stacks of rods to be embodied, such improvements being particularly in the matter of stability, sealing as regards cooling fluid and ease of machining the rods, and has other advantages which will be indicated in the course of the description.

According to the present invention there is provided a nuclear reactor comprising a stack of rods or bars of solid moderator material, each rod having in the external surface a plurality of grooves spaced thereabout, and a plurality of profiled connecting members each having at least three arms each of which engages in a groove of a rod.

According to an important feature of the invention, the dimensions of the said grooves, with respect to those of the said arms, are such that sufficient free space is left at the bottom of each groove for the play resulting from expansion which may occur while the atomic reactor is in operation.

The connecting elements preferably serve to join adjacent rods—that is to say those situated in the same bed—and those disposed in extension of one another, that is to say in neighbouring beds. With this end in view, the different arms of the same profiled member are engaged in grooves in different adjacent rods, and at the same time each of the said arms is engaged in the grooves in two co-axial rods situated in extension of one another.

The groove in one rod is naturally an extension of that in the rod in the following bed.

Two successive co-axial rods may be connected by means of an arm of a profiled member passing into both grooves solely in a region situated on either side of the point at which the two rods are in contact. Such connection may, on the other hand, be made over the whole length of a plurality of rods by means of a profiled member having the length of a plurality of rods.

In a preferred form of embodiment, the stack is also equipped with means for keeping the rods at the desired distance, which is predetermined, from one another. These means consist of distance-pieces.

According to the shape and arrangement of the moderator rods, the profiled members forming the connecting elements may comprise a varying number of connecting arms. As regards the grooves, they may, as the case may be, be disposed in the lateral faces and/or at the angles of the rods, when the latter are of polygonal transverse section.

Nevertheless, particularly remarkable results are obtained in a nuclear reactor comprising vertical rods in the shape of right prisms of regular hexagonal transverse section; the grooves extend along the angles, in planes of symmetry passing through the angles and the vertical axis of the prism.

The lateral faces of each groove are preferably parallel to one another, and the same applies to the lateral faces of the arm of the profiled member intended to engage with slight friction in the groove.

In this preferred form of embodiment the profiled members forming the connecting elements each comprise three identical arms disposed in star fashion, each arm being at an angle of 120° with respect to its neighbour.

In the remainder of the description the connecting elements are designated by the terhnical term "keys."

The stack is held together by means of elastic girdles.

The method of connection to which the invention relates may be isostatic, that is to say it may comprise the same number of connections as degrees of freedom.

Star-shaped three-armed keys engage in parallel-faced grooves hollowed out along the longitudinal angles of the hexagonal prisms. When the said keys are made of graphite, their axis must be parallel to the drawing axis: in this way, lateral fitting tolerances between them and the grooves are preserved under irradiation.

Play must be left between the said keys and the base of the grooves in order not to hinder radial expansion of the rods.

The said keys extend on either side of the plane in which two superposed beds are separated in order to ensure that the ducts bored along the axis of the prismatic rods are in correct alignment.

Consequently, on the one hand a single key may affect six rods, and on the other hand the keys may affect all or part of the height of the rods. Their height will be chosen as the result of a compromise between conditions as regards resistance of materials and considerations of economy in material.

Distance-pieces disposed in the same horizontal plane preserve a constant spacing between the keys, thus defining a framework which is triangulated and therefore indeformable. The distance-pieces may, for example, be cut out of graphite parallel to their drawing axis, which generally corresponds to the direction of minimum Wigner expansion; they may be cut out of any other material which is nuclearly and mechanically acceptable and has little or no sensitivity to the Wigner effect in the direction of the length.

They may be of circular, polygonal or mixed cross-section. Their ends may be cut out in the form of a roof (dihedron) so as to match the profile of the star-shaped keys against which they bear. They may also bear by way of cylindrical surfaces with a circular or other base with its generatrices parallel to those of the star-shaped keys.

However, a better arrangement consists in embodying plane supporting surfaces perpendicular to the axis of the distance-piece. This avoids concentrations of forces due to change of the dihedral angles of the anisotropic solids under irradiation when the planes of the faces of the angles are not parallel to the plane of the main axis of the distance-piece.

Angular displacement of the rods is of no advantage here; in fact, horizontal migration of neutrons is prevented by interpenetration of the prismatic rods comprised in the hexagonal network; vertical migration is hindered by the presence of the distance-pieces, which act as diffusers, and the effectiveness with which they do this increases with their height: in addition, distance-pieces of rectangular cross-section are preferred to those of circular cross-section.

The whole is still held together by elastic girdles which apply a system of centripetal forces to the stack.

The advantages provided by a moderator stack bound in accordance with the invention are as follows:

The number of planes in which there are packings is reduced to one per bed, thus considerably reducing the risk of cooling fluid leakage;

Contact surface between the bars is at a maximum, which makes the stack more stable;

The assembly pieces according to the invention are easily machined, with only a small volume of waste material;

The keys and distance-pieces, which take up very little room, may be made of materials which are more resistant and less sensitive to the Wigner effect than the moderator itself (for example non-nuclear graphite);

If the said pieces are heat-insulated, they may be kept at a higher temperature, and therefore in a zone of better mechanical behaviour if they are made of graphite;

The columns are independent of one another in the vertical direction, thus allowing for different degrees of expansion;

The ducts always remain continuous and rectilinear;

Machining the bars is simplified and more economical.

In addition, the centred hexagonal network makes it possible to "disgorge" the pile more progressively than the square-meshed network, by removing fuel from some cells, thus "flattening" the transverse heat flow curve in more satisfactory fashion.

Various non-limitative examples of use of the method of connection for a solid moderator in an atomic pile with a hexagonal pitch and vertical ducts to which the invention relates will be described hereinafter with reference to the appended diagrammatic FIGURES 1 to 11. The arrangements for embodiment which will be described in connection with these examples must be considered as forming part of the invention, it being understood that any equivalent arrangements may just as well be used without departing from the scope of the invention.

FIGURE 2 is a perspective view on a larger scale of a graphite bar used in the invention.

FIGURES 4 and 4$^{bis}$, 5 and 5$^{bis}$, are perspective views of two types of keys and distance-pieces respectively according to the invention.

Figure 6:
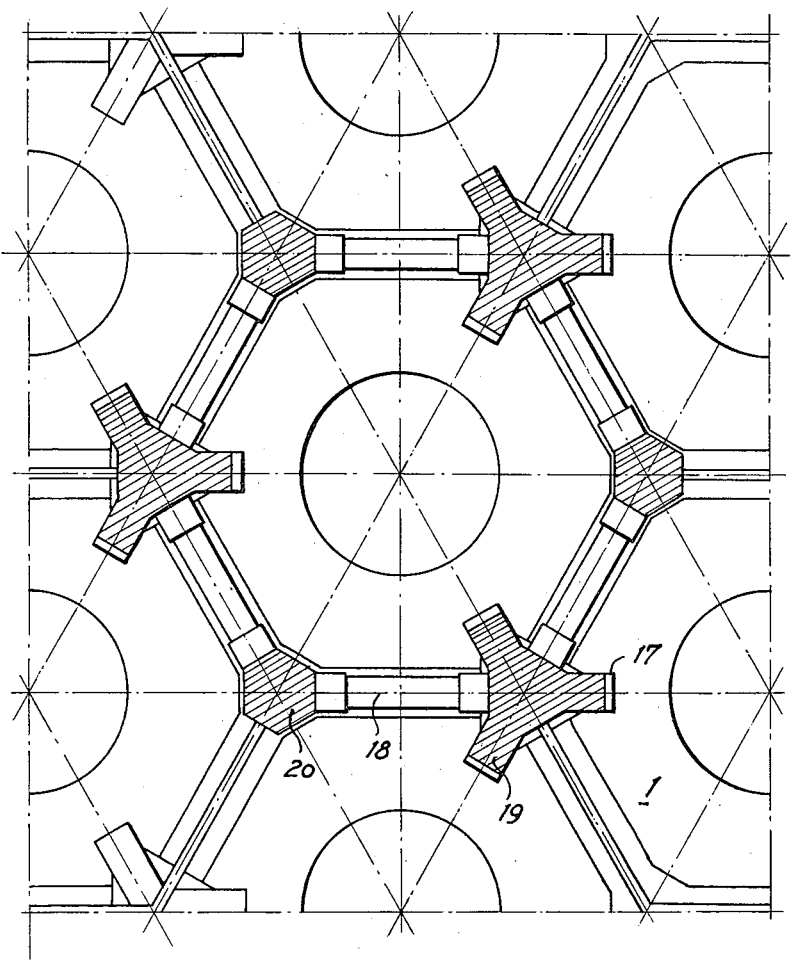

FIGURE 6 is a horizontal section through an isostatic method of connection.

Figure 7:
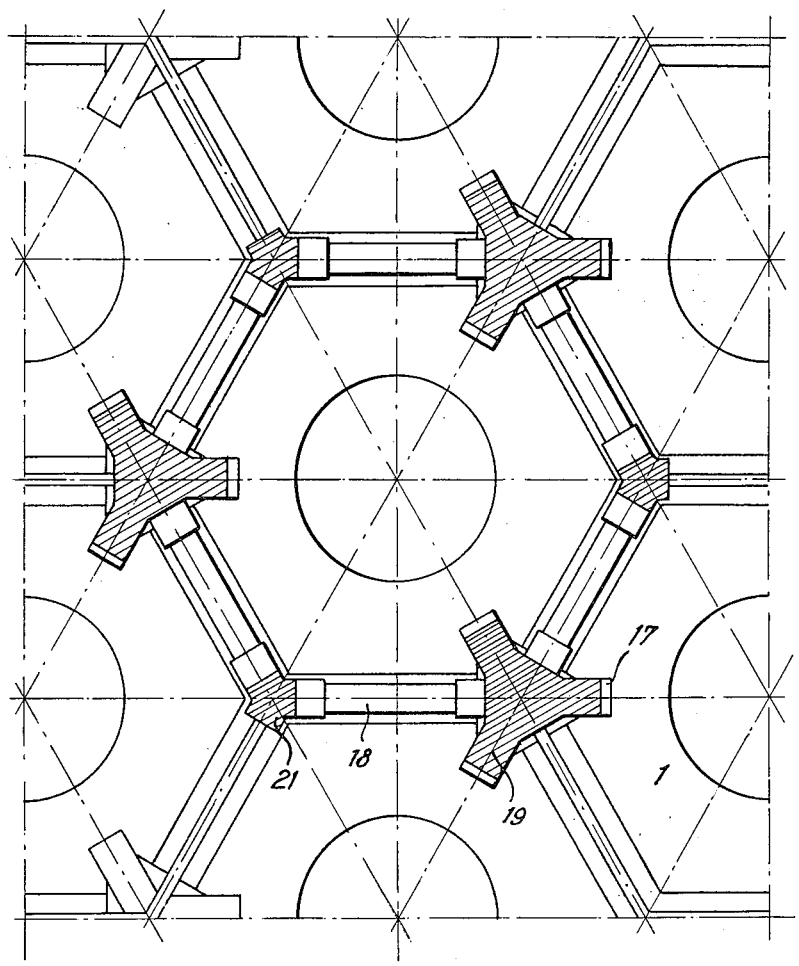

FIGURE 7 is a horizontal section through a variant of this latter method of embodiment.

Figure 1:
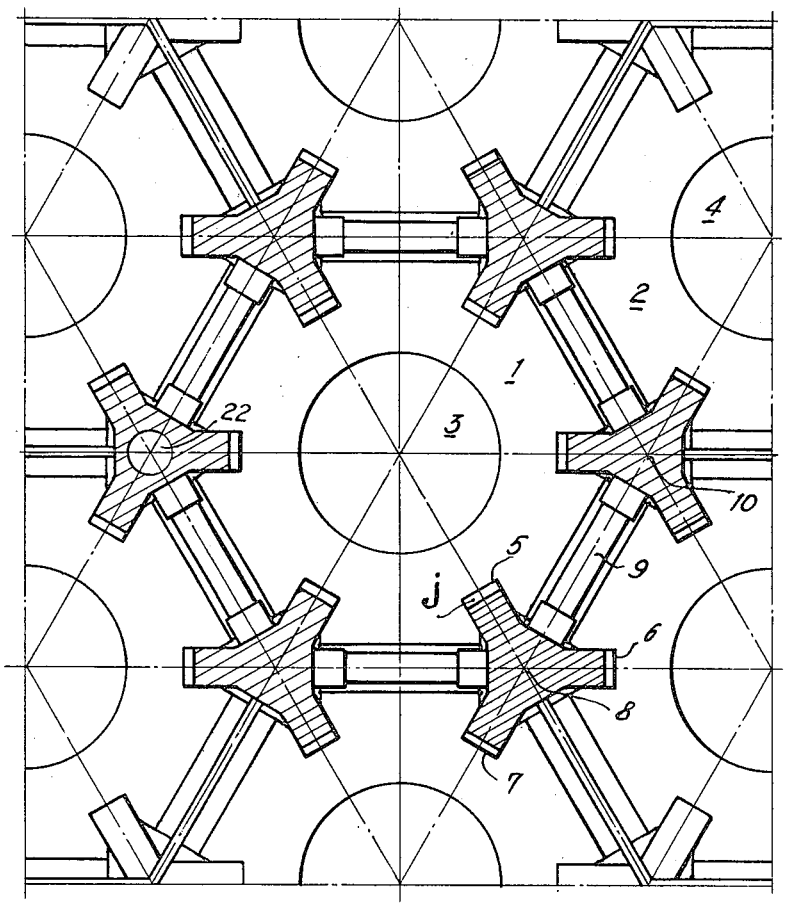
FIGURE 1 is a horizontal section through an example of embodiment of the method of connection to which the invention relates.

FIGURE 8 is a perspective view of a triangular key used in the stack shown in FIGURE 1.

FIGURE 9 is a perspective illustratiion of a distance-piece used in the stack shown in FIGURE 1.

With reference to FIGURE 1, it will be seen that a solid moderator stack according to the invention consists of rods, such as 1 and 2, of regular hexagonal cross-section, made of graphite for example. These rods 1 and 2 are pierced with ducts 3 and 4 in which the fissionable material is disposed.

Each angle of the hexagonal prisms has cut into it a groove with parallel lateral faces, such as 5, 6 or 7. The three arms 81, 82, 83 (FIGURE 8) of the triangular keys, such as 8, are engaged in the said grooves, and hold the neighbouring rods fast; furthermore, according to the invention, the keys overlap two superposed beds of rods so as to hold the said rods fast.

Finally, distance-pieces such as 9 (FIGURE 9), preserve the spacing between the keys such as 8 and 10. A stagnant sheet of gas (of the same nature as the cooling fluid) is advantageously accommodated between the distance-pieces 9 and their seating in order to provide heat-insulation: this is easily done by means of shoulders 22 and 23 at each end of the distance-pieces. In this way, the energy set up in the distance-pieces by neutron-bombardment enables their temperature to be maintained at a higher level than in the other hexagonal prismatic rods 1 or 2, which are cooled by the fluid circulating in the ducts 3 or 4. This arrangement leads to an improvement in the mechanical resistance of the distance-pieces (when they are made of graphite) and an associated reduction in their degree of Wigner expansion.

Seatings of suitable profile are hollowed out in the heads and in the feet of the prismatic rods (or in one end only) in order to receive the distance-pieces. Sufficient play must be left between the distance-pieces and their seating to hinder neither transverse expansion of the pieces nor differential longitudinal expansion of the prismatic rods. The keys and distance-pieces are longitudinally machined along their axis of minimum Wigner expansion, and the only play to be left when fitting up is at the bottom of the grooves 5, as marked by "j" (FIGURE 1).

FIGURES 8 and 9 show the pieces 8 and 9 respectively in detail, their seatings at the end of a graphite rod 1 being shown in FIGURE 2.

Figure 3:
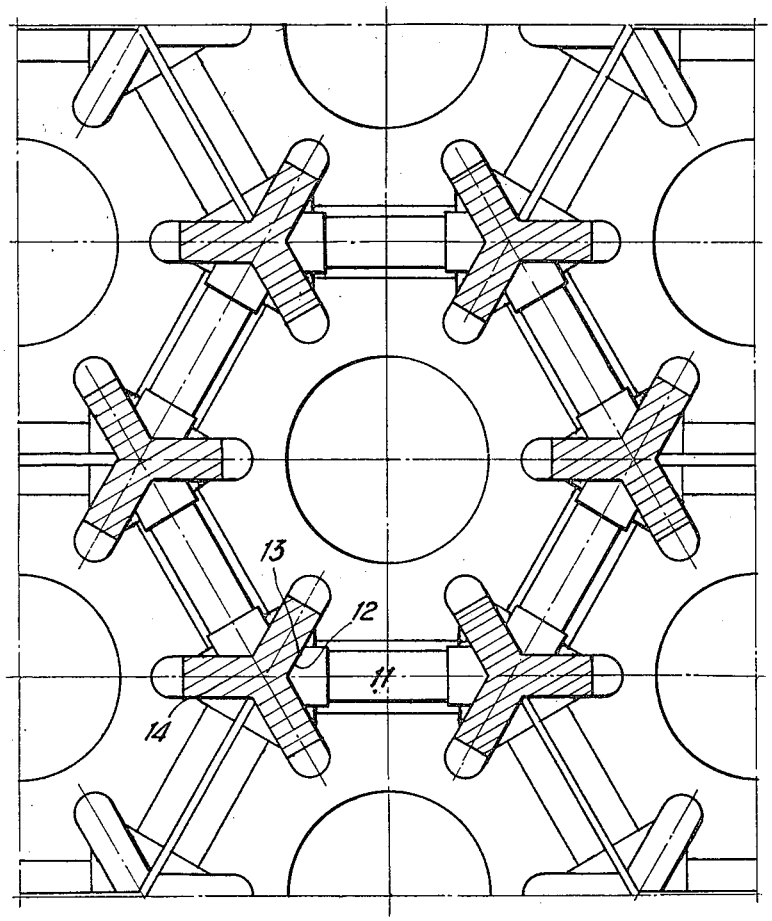
FIGURE 3 is a horizontal section through another method of embodiment of the invention.

FIGURE 3 illustrates a variant of embodiment wherein the ends of the distance-pieces 11, instead of being plane and bearing against flats on the keys, are cut out in the form of dihedron 12, and engage in corresponding seatings 13 in the keys 14.

FIGURE 4 shows a key 14 in perspective; an associated distance-piece 11 is illustrated in FIGURE 4$^{bis}$.

FIGURES 5 and 5$^{bis}$ show a variant in which the bearing surfaces 15 and 16 are cylindrical.

When the control rods are intended to be displaced in special ducts whereof the axis coincides with that of the star-shaped keys 8, the latter must be locally replaced by tubes shown at 22 in FIG. 1, made of beryllium for example, and equipped with external fins engaging in the grooves in the neighbouring rods.

FIGURES 6 and 7 illustrate a variant of embodiment of the method of connection to which the invention relates: this solution differs from the foregoing ones in that the number of grooves 17 hollowed out in each rod 1 is reduced by half.

Each distance-piece 18 then bears on the one hand against a star-shaped key 19, and on the other hand against a hexagonal-based prism 20 (FIGURE 6) or a triangular-based prism 21 (FIGURE 7) whereof the drawing direction and therefore of minimum Wigner expansion—is parallel to that of the rods, and whereof the height is equal to that of the distance—pieces 18.

This variant offers the additional advantage of reducing the volume of material wasted upon machining.

In addition, it eliminates superfluous connections, thus making the system isostatic; any risk of local stress is thus avoided.

What is claimed is:

1. In nuclear moderator structure including a stack of bars of solid moderator material, longitudinal grooves in said bars, profiled connecting members having three arms, each of said arms being received with slight friction in the adjacent groove in the adjacent bar in the same transverse level of the structure, each of said arms engaging at least two bars in adjacent longitudinal relationship, each of said arms terminating short of the bottom of its respective groove whereby play is provided compensating for expansion of the structure during use thereof and transverse distance pices extending between and bearing against adjoining connecting members and carried by each bar in the same transverse plane for maintaining predetermined spacing between adjacent bars.

2. In structure as described in claim 1, said bars being right prisms of regular hexagonal transverse section arranged vertically, said grooves being located in the vertical apices of the prism, and including at least three of said connecting members for each of said bars.

3. Moderator structure as described in claim 1 in which the arms of each of said connecting members are at an angle of 120° with respect to each other.

4. Moderator structure as described in claim 1 in which two lateral faces of each of said grooves and two of the three lateral faces of the corresponding arm are parallel to each other and to planes passing through the axis of the corresponding connecting member and the axis of the corresponding bar.

5. Moderator structure as described in claim 1, including tubular members and fins on said members engaging in adjacent grooves.

6. Moderator structure as described in claim 1 in which said members are beryllium.

7. Moderator structure as described in claim 1 including an elastic girdle surrounding said bars and said connecting members.

8. Moderator structure as described in claim 1 in which said bars and said connecting members are graphite.

9. Moderator structure as described in claim 8 in which the longitudinal faces of said connecting members are parallel to the direction of extrusion of the graphite.

References Cited in the file of this patent

UNITED STATES PATENTS

| 1,985,992 | Hayman | Jan. 1, 1935 |
| 2,609,638 | Lindenmeyer | Sept. 9, 1952 |
| 2,735,146 | Purviance | Feb. 21, 1956 |

FOREIGN PATENTS

| 1,037,036 | Germany | Aug. 21, 1958 |
| 1,211,573 | France | Oct. 12, 1959 |